US010454929B2

United States Patent
Spencer et al.

(10) Patent No.: US 10,454,929 B2
(45) Date of Patent: Oct. 22, 2019

(54) AUTHENTICATING FOR AN ENTERPRISE SERVICE

(71) Applicant: BlackBerry Limited, Waterloo (CA)

(72) Inventors: Mendel Elliot Spencer, Ottawa (CA); Manvinder Singh, Halifax (CA); Balaaji Tirouvengadam, Ottawa (CA); Ying Li, Ottawa (CA); Balasubrahmanyam Gattu, San Ramon, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 93 days.

(21) Appl. No.: 15/382,020

(22) Filed: Dec. 16, 2016

(65) Prior Publication Data

US 2018/0176217 A1    Jun. 21, 2018

(51) Int. Cl.
  *G06F 21/00*  (2013.01)
  *H04L 29/06*  (2006.01)
  *H04L 29/08*  (2006.01)

(52) U.S. Cl.
  CPC ........ *H04L 63/0876* (2013.01); *H04L 63/107* (2013.01); *H04L 63/123* (2013.01); *H04L 63/126* (2013.01); *H04L 63/20* (2013.01); *H04L 67/02* (2013.01); *H04L 63/0892* (2013.01); *H04L 2463/082* (2013.01)

(58) Field of Classification Search
  CPC ... H04L 63/0876; H04L 63/123; H04L 63/20; H04L 63/126; H04L 67/02; H04L 63/107; H04L 2463/082; H04L 63/0892
  See application file for complete search history.

(56) References Cited

U.S. PATENT DOCUMENTS

| 6,308,273 | B1 * | 10/2001 | Goertzel | G06F 21/6218 |
| | | | | 726/2 |
| 8,418,238 | B2 * | 4/2013 | Platt | H04L 63/0815 |
| | | | | 726/1 |
| 9,426,182 | B1 | 8/2016 | Zeljko et al. | |
| 2002/0160810 | A1 * | 10/2002 | Glitho | H04Q 3/0029 |
| | | | | 455/560 |

(Continued)

FOREIGN PATENT DOCUMENTS

| WO | 2004092961 | 10/2004 | | |
| WO | WO-2004092961 A1 * | 10/2004 | ............. | G06F 21/31 |

OTHER PUBLICATIONS

European Search Report in European Application No. 17205767.1 dated Jan. 29, 2018, 9 pages.

(Continued)

*Primary Examiner* — Kendall Dolly
(74) *Attorney, Agent, or Firm* — Fish & Richardson P.C.

(57) ABSTRACT

Systems, methods, and software can be used to provide authentication for an enterprise service. In some aspects, an identity server receives an authentication request. An on-premises verification command is transmitted. The on-premises verification command indicates an on-premises agent that verifies on-premises network connectivity. In response to the on-premises verification command, an on-premises verification response message is received. An authentication response is transmitted based on the received on-premises verification response message.

20 Claims, 4 Drawing Sheets

(56) References Cited

U.S. PATENT DOCUMENTS

| | | | |
|---|---|---|---|
| 2005/0027611 A1* | 2/2005 | Wharton | G06Q 30/06 705/26.62 |
| 2005/0091422 A1* | 4/2005 | Minogue | A61B 5/055 710/8 |
| 2012/0303827 A1* | 11/2012 | Neystadt | H04L 63/107 709/229 |
| 2013/0073387 A1* | 3/2013 | Heath | G06Q 50/01 705/14.53 |
| 2016/0012198 A1* | 1/2016 | Gainer, III | G06F 19/3418 705/2 |
| 2016/0080345 A1* | 3/2016 | Safruti | H04L 67/02 726/6 |

OTHER PUBLICATIONS

Communication under Rule 71(3) EPC issued in European Application No. 17205767.1 dated Feb. 14, 2019, 42 pages.

* cited by examiner

AUTHENTICATING FOR AN ENTERPRISE SERVICE

TECHNICAL FIELD

The present disclosure relates to providing authentication for an enterprise service.

BACKGROUND

In some cases, an identity authentication procedure may be performed in order to obtain services from a service provider. For example, a client device that initiates a service request may be redirected to an identity server. The client device or a user using the client device may provide authentication credentials. The service request may be granted if the authentication credentials are validated.

DESCRIPTION OF DRAWINGS

Like reference numbers and designations in the various drawings indicate like elements.

DETAILED DESCRIPTION

Figure 1:
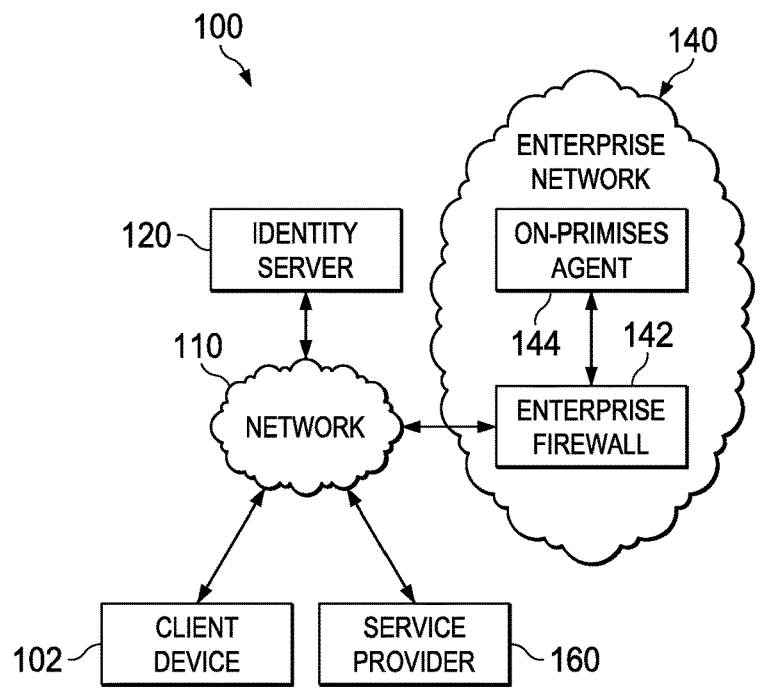
FIG. 1 is a schematic diagram showing an example communication system that provides identity authentication for an enterprise service.

In some cases, an electronic device associated with an enterprise can be on-premises or off-premises. An electronic device can be on-premises if the device is on the physical premises, e.g., inside the building or the campus that is owned or operated by the enterprise, and connected to the enterprise network via for example a wired connection or a secured WiFi network. An electronic device can also be on-premises if the electronic device is operating within the virtual premises of the enterprise, e.g., the electronic device is connected to the enterprise network using a virtual private network (VPN) connection. An electronic device can be off-premises if the device is operating in a remote location without a VPN connection. Generally, an electronic device operating on-premises may be more secure than an electronic device operating off-premises.

In some cases, an identity server that performs the identity authentication for the enterprise service may be implemented inside an enterprise network. Therefore, the identity server is accessible by on-premises devices, but not by the off-premises devices. A client device that is not on-premises, therefore, may not be able to complete the identity authentication procedure and obtain the enterprise service.

In some cases, the identity server may be implemented outside of the enterprise network, e.g., in a cloud. In these or other cases, a client device that is not on-premises can access the identity server, complete the identity authentication procedure, and obtain the enterprise service. However, this may introduce security risks because a device operating off-premises may be subject to more security attacks. Consequently, an enterprise may configure an on-premises security policy for enterprise services that are security sensitive. For example, the enterprise may determine that a client operating off-premises cannot access the enterprise services. Alternatively, the enterprise may determine that a client operating off-premises may be requested to provide additional authentication credentials or procedures in order to obtain the enterprise service.

In some cases, whether the client device requesting the service is on-premises or off-premises can be determined. The identity server can transmit an on-premises verification command. The on-premises verification command can include a script that can be executed by a browser or a client application to transmit an on-premises verification request to the on-premises agent. The on-premises agent can validate the on-premises verification request and transmit an on-premises verification reply to the client device. The client device can transmit an on-premises verification response message to the identity server. The on-premises verification response message can include the on-premises verification reply. The identity server can validate the on-premises verification reply and determine whether the client device is on-premises or off-premises. The identity server can determine whether to reject or accept the service request based on the on-premises security policy of the enterprise. FIGS. 1-5 and associated descriptions provide additional details of these implementations.

FIG. 1 is a schematic diagram showing an example communication system 100 that provides identity authentication for an enterprise service. At a high level, the example communication system 100 includes a client device 102, a service provider (SP) 160, an identity server (IS) 120, and an enterprise network 140 that are communicatively coupled with a network 110.

The SP 160 represents an application, a set of applications, software, software modules, hardware, or any combination thereof that can be configured to provide enterprise services. The enterprise services can include access to enterprise resources, e.g., file systems, websites, portals. The enterprise services can also include services that are provided using enterprise applications, e.g., email, messaging, file sharing, or other applications. Examples of the enterprise service provided by the SP 160 can include software as a service (SaaS) applications such as SALEFORCE, OFFICE 365, or other enterprise software application services. In some cases, access to enterprise services can be granted to users that are authenticated. In these or other cases, the SP 160 can transmit an authentication initiation message for identity authentication, and receive an authentication response indicating whether the identity authentication is successful. FIGS. 2-5 and associated descriptions provide additional details of these implementations.

The enterprise network 140 represents an internal network of an enterprise that can connect one or more computing devices of the enterprise. The enterprise network 140 can include a wireless network, a wireline network, or a combination thereof. The enterprise network 140 can include an enterprise firewall 142. The enterprise firewall 142 represents an application, a set of applications, software, software modules, hardware, or any combination thereof that can be configured to manage communications between computing devices inside of enterprise network 140 and computing devices outside of the enterprise network 140, e.g., through the network 110. The enterprise firewall 142 can include a network firewall, a host-based firewall, or a combination thereof. The network firewall can filter traffic between computing devices inside the enterprise network 140 and outside of the enterprise network 140. The host-based firewall can include a layer of software on one computing device that controls network traffic in and out of that computing device.

The enterprise network 140 can include an on-premises agent (OPA) 144. The OPA 144 represents an application, a set of applications, software, software modules, hardware, or any combination thereof that can be configured to perform on-premises verification for an enterprise. In some cases, the OPA 144 can receive an on-premises verification request from the client device 102, validate the on-premises verification request based on a signature included in the on-premises verification request, and transmit an on-premises verification reply to the client device 102. As shown in FIG. 1 the OPA 144 is behind the enterprise firewall 142. Therefore, if an electronic device is on-premises, the electronic device can transmit messages to and receive messages from the OPA 144. If the electronic device is off-premises, the electronic device may not be able to transmit messages to or receive messages from the OPA 144. FIGS. 2-5 and associated descriptions provide additional details of these implementations.

In some cases, the OPA 144 can be implemented on an enterprise mobility management (EMM) server. The EMM server represents an application, a set of applications, software, software modules, hardware, or any combination thereof that can be configured to manage applications and devices for an enterprise. For example, the EMM server can install, update, and manage the license of enterprise services provided by the SP 160, install, update, and manage the enterprise applications on client device 102, configure security policies executed by the IS 120, or a combination thereof. Alternatively, the OPA 144 can be implemented on a platform that is different than the EMM server.

The IS 120 represents an application, set of applications, software, software modules, hardware, or combination thereof that can be configured to identify an entity. In some cases, the IS 120 can also be referred to as an Identity Assertion Provider. The IS 120 can validate a client device 102, or a user using the client device 102 that requests to access the enterprise service provided by the SP 160 that the application is authenticated. The IS 120 can perform a registration procedure with the OPA 144 to exchange keys, perform identity authentication for the client device 102, generate and transmit an on-premises verification command that includes a client side script. The client side script can be executed by a browser or a client application on the client device 102 to transmit an on-premises verification request to the OPA 144. The IS 120 can verify the on-premises verification response received from the client device 102. The IS 120 can request additional authentication credentials based on an on-premises security policy of the enterprise. FIGS. 2-5 and associated descriptions provide additional details of these implementations.

The client device 102 represents an electronic device that accesses an enterprise service at the SP 160. In some cases, a browser or a client application can be executed on the client device 102 to communicate service requests and service response with the SP 160, authentication credentials with the IS 120, on-premises verification requests and replies with the OPA 144, or any combinations thereof to perform on-premises verifications. The browser or the client application can be configured to support Security Assertion Markup Language (SAML) protocol, OpenID Connect protocol, or a combination thereof that can be used to format the one or more messages used in the on-premises verification procedures. FIGS. 2-5 and associated descriptions provide additional details of these implementations.

Turning to a general description, an electronic device may include, without limitation, any of the following: computing device, mobile device, mobile electronic device, user device, mobile station, subscriber station, portable electronic device, mobile communications device, wireless modem, wireless terminal, or other electronic device. Examples of a mobile device may include a cellular phone, personal data assistant (PDA), smart phone, laptop, tablet, personal computer (PC), pager, portable computer, portable gaming device, wearable electronic device, health/medical/fitness device, camera, communications component in a vehicle, or other mobile communications device having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

The example communication system 100 includes the network 110. The network 110 represents an application, set of applications, software, software modules, hardware, or combination thereof, that can be configured to transmit data messages between the entities in the system 100. The network 110 includes a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, or any other radio access technologies. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components, as appropriate.

Figure 2:
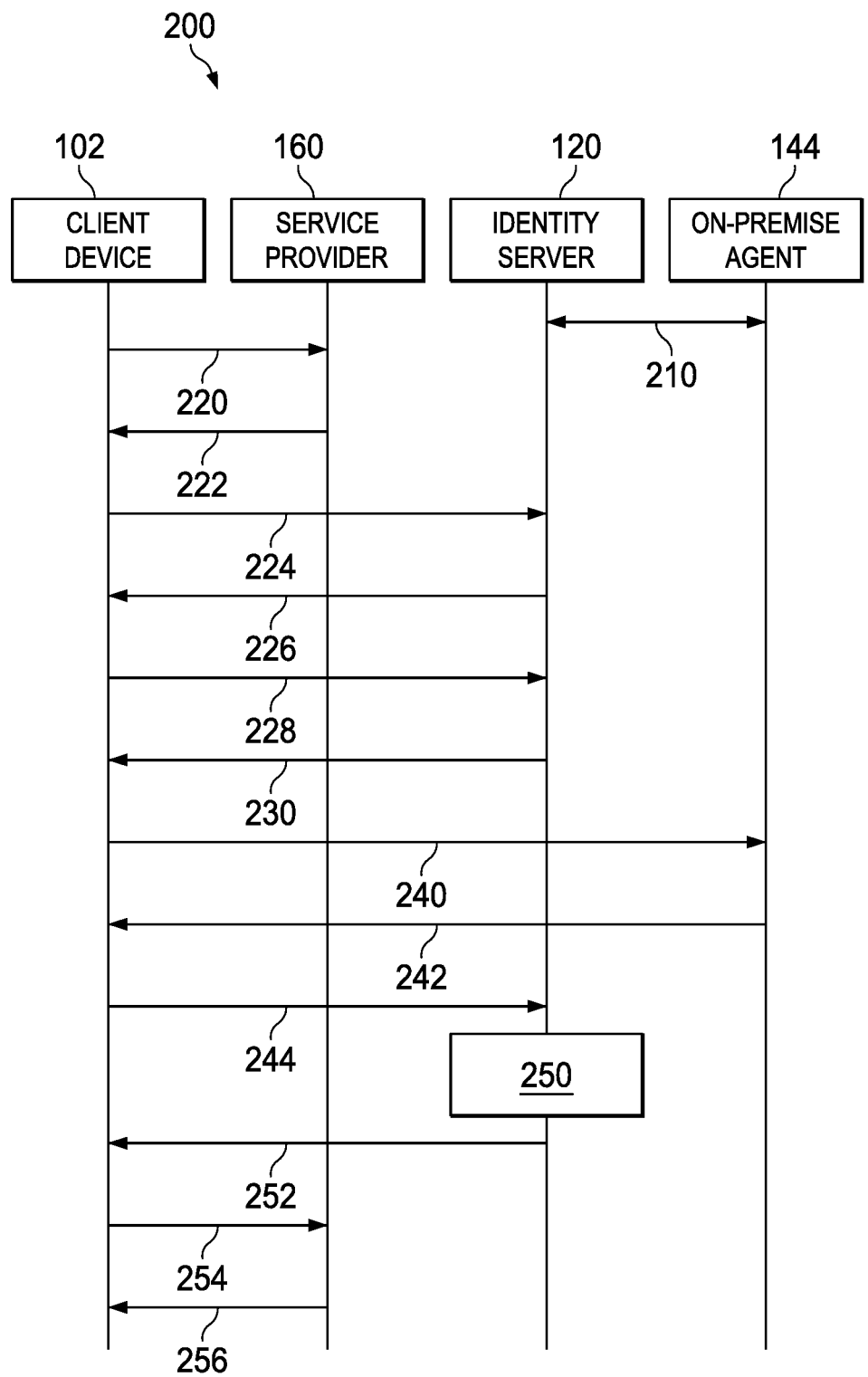
FIG. 2 is a flow diagram showing an example process that provides identity authentication for an enterprise service according to an implementation.

FIG. 2 is a flow diagram showing an example process 200 that provides identity authentication for an enterprise service according to an implementation. The process 200 can be implemented by one or more entities shown in FIG. 1, or any other systems or modules that provide authentications for an enterprise service. For example, the process 200 can be implemented by the client device 102, the SP 160, the IS 120, and the OPA 144, or a combination thereof. The example process 200, shown in FIG. 2, can also be implemented using additional, fewer, or different operations, which can be performed in the order shown or in a different order.

The example process 200 begins at 210, where the IS 120 and the OPA 144 perform a registration procedure. In some cases, the IS 120 can also be configured with the address of one or more OPAs that can provide on-premises verifications for an enterprise. For example, the IS 120 can provide a user interface for an administrator of the enterprise to add, remove, or change one or more addresses, e.g., hostnames, of the OPAs for an enterprise. In some cases, the IS 120 can also provide a user interface for the administrator to configure the on-premises security verification policy for the enterprise. Alternatively or additionally, an EMM server of a particular enterprise can send the address information of the OPAs, the on-premises security verification policy, or a combination thereof that are associated with the particular enterprise to the IS 120.

In some cases, during the registration procedure, one or more keys can be exchanged between the IS 120 and the OPA 144. The one or more keys can be used in the identity authentication process discussed in subsequent steps. In some cases, a symmetric key can be used in the authentication process. In these or other cases, the same key can be used by the IS 120 and the OPA 144 to generate a signature and validate the signature. For example, the OPA 144 can generate a key and send it to the IS 120, or vice versa. In some cases, the IS 120 can provide identity authentication for more than one enterprises. In these cases, different keys can be configured for each enterprise and the IS 120 can use the key associated with a particular enterprise to communicate with the OPA associated with the particular enterprise. Alternatively or additionally, more than one OPA can be associated with the same enterprise, and each OPA can be configured with its own key that can be used to communicate with the IS 120. In some cases, an asymmetric key can be used in the authentication process. In these or other cases, different keys can be generated and exchanged for the IS 120 and the OPA 144, respectively.

At 220, the client device 102 transmits a service request to the SP 160. The service request can include a request for an enterprise service provided by the SP 160. In some cases, the service request can be initiated by a browser executed on the client device 102. For example, a user can input a Uniform Resource Locator (URL) that points to the enterprise service provided by the SP 160 to the browser. The browser can generate a request, e.g., "get SaaS," that requests the enterprise service. The request can include information indicating the service that is requested. Alternatively or additionally, a client application executed on the client device 102 can be used to generate the service request.

At 222, the SP 160 transmits an authentication initiation message to the client device 102 to perform an identity authentication process. In some cases, the SP 160 determines that the service request is for an enterprise service which requires identity authentication, and the authentication initiation message is transmitted in response to the determination that the identity authentication is required. In some cases, the authentication initiation message can be an SAML command or an OpenID authentication request that redirects the client device 102 towards the IS 120. The authentication initiation message can include information associated with the IS 120, e.g., the address of the IS 120, the service that is requested at 220, or a combination thereof.

At 224, the client 102 transmits an authentication request message for identity authentication to the IS 120. In some cases, the browser or a client application on the client 102 can be used to generate the authentication request message. In some cases, the authentication request message can be an SAML request or an OpenID Connect request. In some cases, the authentication request message can include information identifying the client device 102, the enterprise service that is requested, whether an user interface interaction is prompted, the scope of access request, the level of authentication or assurance required, the version of the authentication protocol, the type of response required, where responses should be sent, or any combinations thereof.

At 226, the IS 120 transmits an authentication credential request message to the client device 102. The authentication credential request message can request identity authentication credentials from the client device 102. In some cases, the authentication credential request message can be a redirect command that redirects the client device 102 to a login page. In some cases, the IS 120 can provide identity authentication for more than one enterprises, and each of the more than one enterprises can be configured with a different login page. In these or other cases, the IS 160 can identify the enterprise that is associated with the client device 102 or the enterprise service requested by the client device 102 based on the authentication request message. The IS 120 can select the login page that is configured for the identified enterprise, and the redirect command can redirect the client device 102 to the selected login page.

At 228, the client device 102 transmits an authentication credential response message to the IS 160. The authentication credential response message can include one or more identity authentication credentials for the client device 102. Examples of the identity authentication credentials can include a username, a password, answers to security verification questions, or any combinations thereof. In some cases, as discussed previously, the client device 102 can be redirected to a login page. A user can input the username and password in the login page at the client device 102.

At 230, the IS 120 transmits an on-premises verification command to the client device 102. In some cases, the IS 120 can verify the identity of the client device 102 based on the authentication credentials included in the authentication credential response message, e.g., the username and password. If the authentication credentials are not verified, the IS 120 can transmit an authentication response indicating that the identity verification has failed. If the authentication credentials are verified, the IS 120 can proceed to transmit the on-premises verification command.

In some cases, the IS 120 can identify the enterprise associated with the client device 102 or the enterprise service requested based on the authentication request message, the authentication credential response message, or a combination thereof. The IS 120 can determine whether on-premises verification is configured for the client device 102, the user that requests the enterprise service using the client device 102, or the identified enterprise associated with the user or the client device 102. The on-premises verification command can be sent in response to the determination that on-premises verification is configured for the identified enterprise. In some cases, the on-premises verification command can include an address for the OPA 144 that is configured to perform the on-premises verification for the identified enterprise. The address can be a URL indicating the hostname of the OPA 144.

In some cases, the on-premises verification command can include a client side script. The client side script can be executed by a browser or a client application to transmit an on-premises verification request to the OPA 144. Examples of the client side scripts include JavaScript, Flash, or Silverlight. In some cases, the on-premises verification request is generated by the IS 120 and included by the IS 120 in the client side script. In some cases, the on-premises verification request can include information identifying the IS 120, a timestamp, or any other authentication information. In some cases, the on-premises verification request can be signed with a key of the IS 120. In some cases, the IS 120 can provide identity authentication for more than one enterprises, and therefore the IS 120 can configure a different key for each enterprise, or each OPA that is associated with a particular enterprise, or a combination thereof. In these or other cases, the IS 120 can sign the on-premises verification request using the key that is associated with the enterprise identified previously, or a particular OPA that is associated with the enterprise identified previously. In some cases, the key can be an HMAC key.

At 240, the client device 102 transmits the on-premises verification request to the OPA 144. In some cases, as described previously, the browser or the client application running on the client device 102 can execute the client side script included in the on-premises verification command, which causes the client device 102 to transmit the on-premises verification request.

At 242, the OPA 144 transmits an on-premises verification reply to the client device 102 in response to the on-premises verification request. In some cases, the OPA 144 can validate the on-premises verification request. For example, the OPA 144 can verify that the signature included in the on-premises verification request is signed with the key that corresponds to the OPA 144. The OPA 144 can also verify, based on the timestamp included in the on-premises verification request, that the time elapsed between generating the on-premises verification request by the IS 120 and receiving the on-premises verification request by the OPA 144 does not exceed a configured threshold. The on-premises verification reply can indicate whether the on-premises verification request is successfully validated. In some cases, the OPA 144 can include the current time stamp, identity information of the OPA 144, or any other authentication information in the on-premises verification reply. In some cases, the OPA 144 can sign the on-premises verification reply with its own key.

At 244, the client device 102 transmits an on-premises verification response message to the IS 120. In some cases, the on-premises verification response message includes the on-premises verification reply that is received by the client device 102 at step 242. In some cases, e.g., if the client device 102 fails to access the OPA 144 and receives the on-premises verification reply from the OPA 144, the client device 102 can include an error message in the on-premises verification response message.

At 250, the IS 120 determines whether the on-premises verification is successful based on the on-premises verification response message. The IS 120 can determine whether a valid on-premises verification reply is included in the on-premises verification response message. For example, the IS 120 can verify the signature included in the on-premises verification reply is signed with the key that is associated with the OPA 144. The IS 120 can further check the elapsed time based on the time stamp included in the on-premises verification reply to determine whether the on-premises verification reply is on time. In some cases, as described previously, the on-premises verification is performed after the identity of the client device 102 or the user that requests the enterprise service using the client device 102 has been verified based on the authentication credentials. In these or other cases, if the on-premises verification reply is validated, at 252, the IS 120 can transmit an authentication response indicating that the identity verification is successful. Alternatively, the on-premises verification can be performed before the identity of the client device 102 or the user using the client device 102 has been verified. In these or other cases, if the on-premises verification reply is validated, the IS 120 can proceed to verify the identity of the client device 102 or the user using the client device 102 based on the authentication credentials. If the identity is verified, at 252, the IS 120 transmits an authentication response indicating that the identity verification is successful. If the identity is not verified, the IS 120 can transmit an authentication response indicating that the identity verification has failed.

If the client device 102 is off-premises, the client 102 may not have a secured connection with the OPA 144 and therefore may not be able to receive the on-premises verification reply from the OPA 144. In these cases, the on-premises verification would fail. The IS 120 can determine that the on-premises verification has failed if the on-premises verification response message includes an error message indicating that the client device 102 fails to reach the OPA 144 or if the on-premises verification reply included in the on-premises verification response message is not validated. The IS 120 can also determine that the on-premises verification has failed if the IS 120 has not received an on-premises verification response message within a configured time period from the transmission of the on-premises verification command. If the IS 120 determines that the on-premises verification has failed, the IS 120 can determine the next step of the authentication procedure based on the on-premises security verification policy configured for the enterprise associated with the client device 102 or the enterprise service requested. In one example, the on-premises security verification policy can indicate that the enterprise service is rejected if the client device 102 is not on-premises. In this example, at 252, the IS 120 transmits an authentication response indicating that the identity verification has failed. In another example, the on-premises security verification policy can indicate that additional authentication credentials may be requested in order to verify the identity of the user. In this example, the IS 120 can transmit one or more requests to the client device 102 for additional authentication credentials. The additional authentication credentials can be any credential that can be used as a secondary factor for authentication, e.g., a one-time-passcode that was sent to the user via short message service (SMS), or a confirmation sent to a device or an account that is known to associated with the user. At 252, the IS 120 can transmit an authentication response indicating whether the identity verification succeeds or fails based on the additional authentication credentials. This approach enables an enterprise to configure different tiers of identity verification procedures for users that are on-premises and off-premises.

In some cases, the authentication response can include an authorization token. The authorization token can indicate whether the authentication succeeds or fails. In some cases, the authorization token can also be signed with a key of the IS 120, and therefore can be validated by the SP 160. In some cases, the authentication token can be formatted as an SAML assertion, an OpenID Connect ID Token, or an OAUTH Access token.

At 254, the client device 102 forwards the authentication response, or the authentication token included in the authentication response to the SP 160. The SP 160 can determine whether the identity of the client device 102 has been successfully validated based on the authentication response or the authentication token. At 256, the SP 160 transmits a service response. If the identity validation succeeds, the service response indicates that the service request is granted. If the identity validation fails, the service response indicates that the service request is rejected.

In some cases, the signaling exchanges for the on-premises verifications described previously, e.g., the on-premises verification command, the on-premises verification request, the on-premises verification request reply, or any combinations thereof, can be transmitted according to a Hypertext Transfer Protocol secure (HTTPS) protocol. In these or other cases, the client device 102 can verify the certificates of the OPA 144 and establish a secure channel between the client device 102 and the OPA 144 using the secure channel.

Figure 3:
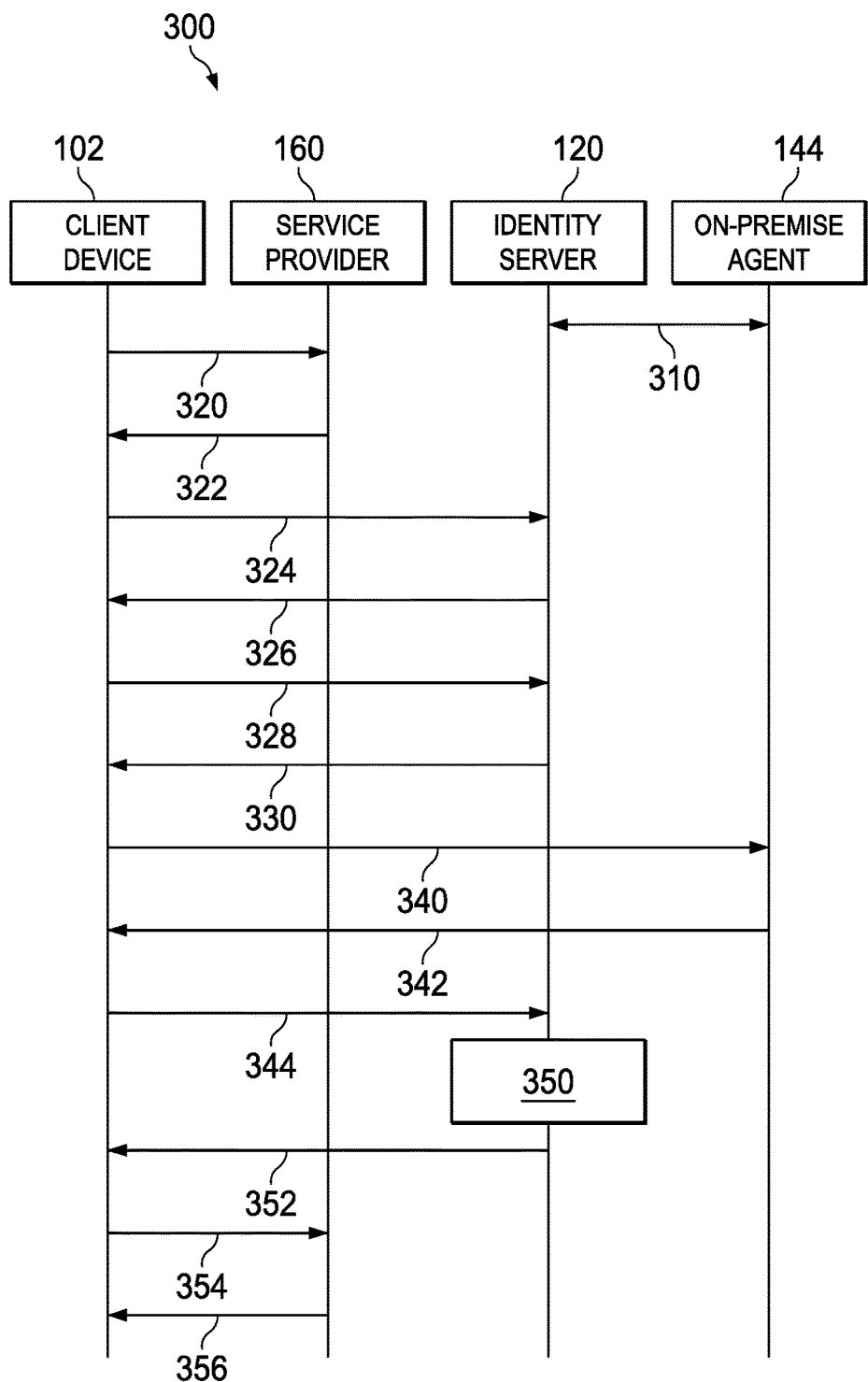
FIG. 3 is a flow diagram showing an example process that provides identity authentication for an enterprise using HTTP according to an implementation.

In some cases, the OPA 144 may be implemented on an enterprise entity that does not have a certificate issued by a well-known certificate authority (CA). In these or other cases, the client device 102 may not be able to verify the certificate of the OPA 144, and therefore may not be able to exchange signaling messages with the OPA 144 using the HTTPS protocol. Therefore, one or more on-premises verification messages can be transmitted according to a Hypertext Transfer Protocol (HTTP) protocol. FIG. 3 is a flow diagram showing an example process 300 that provides identity authentication for an enterprise using HTTP, according to an implementation.

The process 300 can be implemented by one or more entities shown in FIG. 1, or any other systems or modules that provide authentications for an enterprise service. For example, the process 300 can be implemented by the client device 102, the SP 160, the IS 120, and the OPA 144, or a combination thereof. The example process 300, shown in FIG. 3, can also be implemented using additional, fewer, or different operations, which can be performed in the order shown or in a different order.

Similar to FIG. 2, the example process 300 begins at 310, where the IS 120 and the OPA 144 perform a registration procedure. At 320, the client device 102 transmits a service request to the SP 160. At 322, the SP 160 transmits an authentication initiation message to the client device 102 to perform an identity authentication process. At 324, the client 102 transmits an authentication request message for identity authentication to the IS 120. The IS 120 identifies the enterprise associated with the client device 102 and the OPA 144 and determines that on-premises verification is required. In some cases, the IS 120 can determine that the OPA 144 does not have a certificate issued by a well-known CA, and therefore the on-premises verification messages between the client device 102 and the OPA 144 may be performed using the HTTP protocol.

At 326, the IS 120 transmits an authentication credential request message to the client device 102. The authentication credential request message can request identity authentication credential from the client device 102. In some cases, the authentication credential request message can be a redirect command that can redirect the client device 102 to a login page. In some cases, the IS 120 can support communications over the HTTP and HTTPS protocols using different host names. For example, the IS 120 can use one host name for the HTTPS communication, and a different host name for HTTP communication. In this case, because the IS 120 determines that the on-premises verification would be performed over the HTTP protocol, the IS 120 can include the host name for the HTTP communication in the redirect command.

In some cases, to improve security, the IS 120 can include a one-time-token in the authentication credential request message. The one-time-token can be a one-time-passcode. The one-time passcode can be a random number generated at the IS 120 for each on-premises verification. Alternatively, the one-time-token can include an encrypted token that includes a time stamp indicating the current time, a nonce value, or a combination thereof. The encrypted token can be encrypted using an encryption key of the IS 120.

At 328, the client device 102 transmits an authentication credential response message to the IS 120. Similar to FIG. 2, the authentication credential response message can include one or more identity authentication credentials for the client device 102. The authentication credential response message at 328, however, is transmitted over the HTTP protocol using a host name of the IS 120 that provides communication over HTTP protocol. The authentication credential response message can include the one-time-token received at 326.

At 330, the IS 120 can verify the one-time-token included in the authentication credential response message to determine that the authentication credential response message is genuine. For example, the IS 120 can verify that the one-time-token is a one-time-passcode that is transmitted by the IS 120 at 326. Alternatively, if the one-time-token is an encrypted token, the IS 120 can use its key to decrypt the encrypted token and verify the time stamp included in the encrypted token to determine whether the one-time-token is genuine and received within a configured time after the generation. In some cases, the IS 120 can be implemented in more than one physical platforms, and the instance of the IS 120 that generates and transmits the one-time-token at 326 may be implemented on a platform that is different than the instance of the IS 120 that receives and verifies the one-time-token. In these or other cases, a one-time-passcode can be used as the one-time-token if the two instances of the IS 120 share the information of the one-time-passcode. An encrypted token can be used as the one-time-token if the two instances of the IS 120 share the information of the key that is used to encrypt and decrypt the token. While the authentication credential response message is communicated over the HTTP protocol, using the one-time-token can reduce the risks of attacks from malicious devices.

At 330, the IS 120 transmits an on-premises verification command to the client device 102. Similar to FIG. 2, the on-premises verification command can include a client side script. The client side script can be executed by a browser or a client application to transmit an on-premises verification request to the OPA 144. At 340, the client device 102 transmits the on-premises verification request to the OPA 144 by executing the client side script. At 342, the OPA 144 transmits an on-premises verification reply to the client device 102 in response to the on-premises verification request. At 344, the client device 102 transmits an on-premises verification response message to the IS 120. The on-premises verification response message can include the on-premises verification reply that is received by the client device 102 at step 342. Here, the on-premises verification command, the on-premises verification request, the on-premises verification reply, the on-premises verification response message, or any combinations thereof can be transmitted using the HTTP protocol.

Similar to FIG. 2, at 350, the IS 120 determines whether the on-premises verification is successful based on the on-premises verification response message. The IS 120 can also determine whether additional authentication credentials should be requested based on the on-premises security verification policy. At 352, the IS 120 transmits an authentication response to the client device 102 indicating whether the identity verification is successful. The authentication response can include an authentication token, e.g., an SAML assertion or an OpenID Connect ID Token.

At 354, the client device 102 forwards the authentication response, or the authentication token included in the authentication response to the SP 160. At 356, the SP 160 transmits a service response, indicating whether the service request is granted or rejected.

Figure 4:
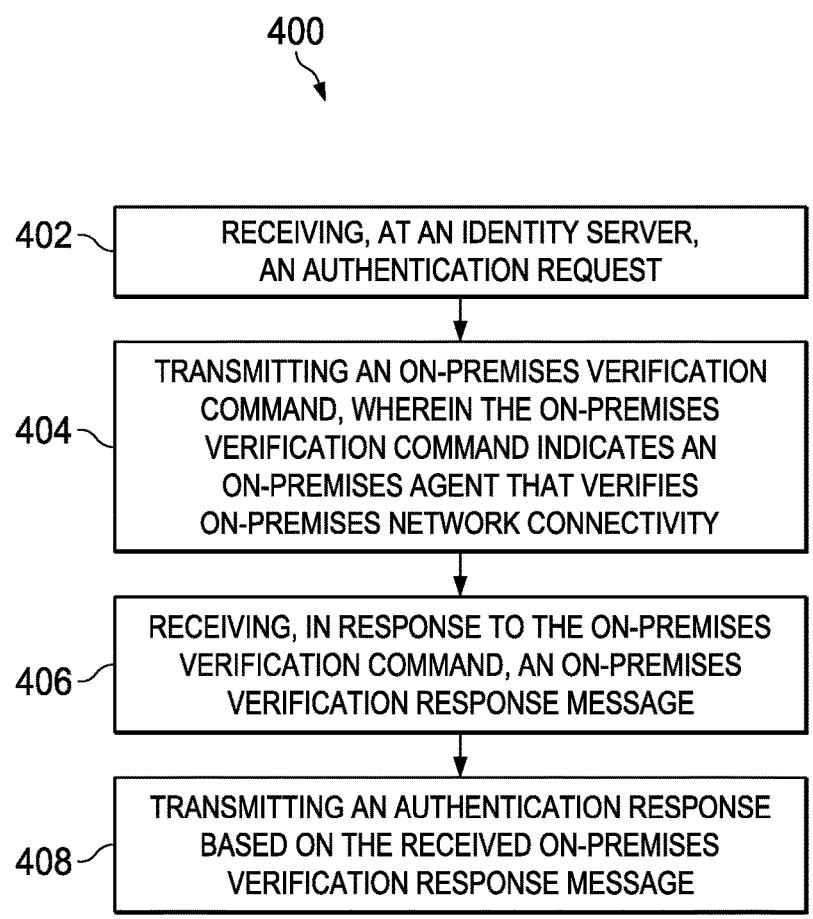
FIG. 4 is a flow diagram showing an example method that provides identity authentication for an enterprise service according to an implementation.

FIG. 4 is a flow diagram showing an example method 400 that provides identity authentication for an enterprise service, according to an implementation. The method 400 can be implemented by an IS, e.g., the IS 120 shown in FIG. 1. The method 400 shown in FIG. 4 can also be implemented using additional, fewer, or different entities. Furthermore, the method 400 shown in FIG. 4 can also be implemented using additional, fewer, or different operations, which can be performed in the order shown or in a different order.

The example method 400 begins at 402, where an IS receives an authentication request. At 404, the IS transmits an on-premises verification command. The on-premises verification command indicates an on-premises agent that verifies on-premises network connectivity. In some cases, the on-premises verification command includes a script that, when executed, causes a browser or a client application to transmit an on-premises verification request to the on-premises agent. The on-premises verification request can be signed using a key associated with the on-premises agent. At 406, in response to the on-premises verification command, the IS receives an on-premises verification response message. The on-premises verification response message indicates whether the on-premises verification is successful. At 408, the IS transmits an authentication response based on the received on-premises verification response message.

Figure 5:
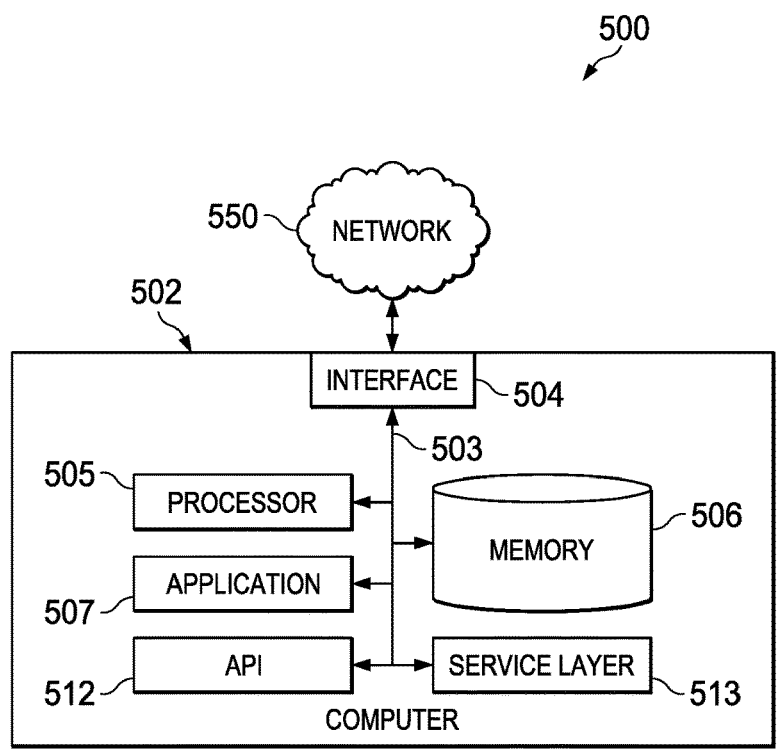
FIG. 5 is a high-level architecture block diagram of a computing system according to an implementation.

FIG. 5 is a high-level architecture block diagram of a computing system 500 according to an implementation. At a high level, the illustrated system 500 includes a computer 502 that is communicably coupled with a network 550. The described illustration is only one possible implementation of the described subject matter and is not intended to limit the disclosure to the single described implementation. Those of ordinary skill in the art will appreciate the fact that the described components can be connected, combined, or used in alternative ways consistent with this disclosure.

The network 550 facilitates communications between the components of the system 500. In some cases, a user, e.g., an administrator can access the computer 502 from a remote network. In these or other cases, the network 550 can be a wireless or a wireline network. In some cases, a user can access the computer 502 locally. In these or other cases, the network 550 can also be a memory pipe, a hardware connection, or any internal or external communication paths between the components.

The computer 502 includes a computing system configured to provision on-premises verifications. For example, the computer 502 can be included in a client device, an identity server, an on-premises agent, an EMM server, or other entities in the system 100, to perform the algorithm described in this disclosure. In some cases, the algorithm can be implemented in an executable computing code, e.g., C/C++ executable codes. Alternatively or in combination, the algorithm can be implemented in an application program, e.g., EXCEL. In some cases, the computer 502 can include a standalone Linux system that runs batch applications. In some cases, the computer 502 can include mobile or personal computers that run the application program.

The computer 502 may include an input device, such as a keypad, keyboard, touch screen, microphone, speech recognition device, other device that can accept user information, and/or an output device that conveys information associated with the operation of the computer 502, including digital data, visual and/or audio information, or a GUI.

The computer 502 can serve as a client, network component, a server, a database or other persistency, and/or any other component of the system 500. In some implementations, one or more components of the computer 502 may be configured to operate within a cloud-computing-based environment.

At a high level, the computer 502 is an electronic computing device operable to receive, transmit, process, store, or manage data and information associated with the system 500. According to some implementations, the computer 502 may also include or be communicably coupled with an application server, e-mail server, web server, caching server, streaming data server, business intelligence (BI) server, and/or other server.

The computer 502 can receive requests over network 550 from a client application (e.g., executing on another computer 502) and respond to the received requests by processing the said requests in an appropriate software application. In addition, requests may also be sent to the computer 502 from internal users (e.g., from a command console or by another appropriate access method), external or third parties, other automated applications, as well as any other appropriate entities, individuals, systems, or computers.

Each of the components of the computer 502 can communicate using a system bus 503. In some implementations, any and/or all the components of the computer 502, both hardware and/or software, may interface with each other and/or the interface 504 over the system bus 503, using an application programming interface (API) 512 and/or a service layer 513. The API 512 may include specifications for routines, data structures, and object classes. The API 512 may be either computer language-independent or -dependent and refer to a complete interface, a single function, or even a set of APIs. The service layer 513 provides software services to the computer 502 and/or the system 500. The functionality of the computer 502 may be accessible for all service consumers using this service layer. Software services, such as those provided by the service layer 513, provide reusable, defined business functionalities through a defined interface. For example, the interface may be software written in JAVA, C++, or other suitable language providing data in Extensible Markup Language (XML) format or other suitable format. While illustrated as an integrated component of the computer 502, alternative implementations may illustrate the API 512 and/or the service layer 513 as stand-alone components in relation to other components of the computer 502. Moreover, any or all parts of the API 512 and/or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems in a distributed environment— including within the system 500—connected to the network 550—(whether illustrated or not). Generally, the interface 504 comprises logic encoded in software and/or hardware in a suitable combination and operable to communicate with the network 550. More specifically, the interface 504 may comprise software supporting one or more communication protocols associated with communications such that the network 550 or interface's hardware is operable to communicate physical signals within and outside of the illustrated system 500.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502. Specifically, the processor 505 executes the functionality required for provisioning enterprise services. In some cases, the processor 505 can include a data processing apparatus.

The computer 502 also includes a memory 506 that holds data for the computer 502. Although illustrated as a single memory 506 in FIG. 5, two or more memories may be used according to particular needs, desires, or particular implementations of the computer 502. While memory 706 is illustrated as an integral component of the computer 502, in alternative implementations, memory 506 can be external to the computer 502.

The application 507 is an algorithmic software engine providing functionality according to particular needs, desires, or particular implementations of the computer 502, particularly with respect to functionality required for provisioning enterprise service. Although illustrated as a single application 507, the application 507 may be implemented as multiple applications 507 on the computer 502. In addition, although illustrated as integral to the computer 502, in alternative implementations, the application 507 can be external to the computer 502.

There may be any number of computers 502 associated with, or external to, the system 500 and communicating over network 550. Further, the terms "client," "user," and other appropriate terminology may be used interchangeably, as appropriate, without departing from the scope of this disclosure. Moreover, this disclosure contemplates that many users may use one computer 502, or that one user may use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non-volatile memory, media and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to, or represent, the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A method, comprising:
   receiving, at an identity server, from a client device, an authentication request;
   in response to receiving the authentication request, transmitting, from the identity server to the client device over a network, an on-premises verification command, wherein the on-premises verification command indicates an on-premises agent that verifies whether the client device has on-premises network connectivity;
   determining, by the identity server, whether an authentication succeeds or fails based on whether an on-premises verification response message is received from the client device in response to the on-premises verification command, wherein the on-premises verification response message indicates whether the client device has on-premises network connectivity; and
   transmitting, by the identity server, an authentication response, wherein the authentication response indicates whether the authentication succeeds or fails based on whether the on-premises verification response message is received from the client device in response to the on-premises verification command.

2. The method of claim 1, wherein the on-premises verification command comprises a script that, when executed, causes a browser to transmit an on-premises verification request to the on-premises agent.

3. The method of claim 2, wherein the on-premises verification request is signed using a key associated with the on-premises agent.

4. The method of claim 1, wherein the on-premises verification command is transmitted according to a Hypertext Transfer Protocol secure (HTTPS) protocol.

5. The method of claim 1, further comprising:
sending a redirect command, wherein the redirect command includes a one-time-token;
receiving a redirected request;
verifying the redirected request based on the one-time-token; and
wherein the on-premises verification command is transmitted according to a Hypertext Transfer Protocol (HTTP) protocol.

6. The method of claim 1, further comprising:
receiving the on-premises verification response message;
determining that the on-premises verification response message comprises a valid on-premises verification reply; and
in response to determining that the on-premises verification response message comprises the valid on-premises verification reply, constructing the authentication response to indicate that the authentication succeeds.

7. The method of claim 6, wherein determining that the on-premises verification response message comprises the valid on-premises verification reply comprises verifying that the on-premises verification response message includes a signature signed by the on-premises agent.

8. The method of claim 1, further comprising:
determining that the on-premises verification response message has not been received within a configured time period or that the on-premises verification response message does not comprise a valid on-premises verification reply;
determining, based on a security policy associated with the on-premises agent, that an additional authentication credential is configured to be requested; and
requesting the additional authentication credential based upon the determining that the additional authentication credential is configured to be requested.

9. The method of claim 1, further comprising:
determining that the on-premises verification response message has not been received within a configured time period or that the on-premises verification response message does not comprise a valid on-premises verification reply;
determining, based on a security policy associated with the on-premises agent, that an additional authentication credential is not configured to be requested; and
constructing the authentication response to indicate that the authentication fails based upon the determining that the additional authentication credential is not configured to be requested.

10. The method of claim 1, wherein the on-premises agent operates inside of an enterprise network, and the identity server operates outside of the enterprise network.

11. An identity server, comprising:
at least one hardware processor; and
a non-transitory computer-readable storage medium coupled to the at least one hardware processor and storing programming instructions, wherein the programming instructions, when executed, instruct the at least one hardware processor to:
receive, at the identity server, from a client device, an authentication request;
in response to receiving the authentication request, transmit, from the identity server to the client device over a network, an on-premises verification command, wherein the on-premises verification command indicates an on-premises agent that verifies whether the client device has on-premises network connectivity;
determine, by the identity server, whether an authentication succeeds or fails based on whether an on-premises verification response message is received from the client device in response to the on-premises verification command, wherein the on-premises verification response message indicates whether the client device has on-premises network connectivity; and
transmit, by the identity server, an authentication response, wherein the authentication response indicates whether the authentication succeeds or fails based on whether the on-premises verification response message is received from the client device in response to the on-premises verification command.

12. The identity server of claim 11, wherein the on-premises verification command comprises a script that, when executed, causes a browser to transmit an on-premises verification request to the on-premises agent.

13. The identity server of claim 12, wherein the on-premises verification request is signed using a key associated with the on-premises agent.

14. The identity server of claim 11, wherein the on-premises verification command is transmitted according to a Hypertext Transfer Protocol secure (HTTPS) protocol.

15. The identity server of claim 11, wherein the programming instructions instruct the at least one hardware processor to:
send a redirect command, wherein the redirect command includes a one-time-token;
receive a redirected request;
verify the redirected request based on the one-time-token; and
wherein the on-premises verification command is transmitted according to a Hypertext Transfer Protocol (HTTP) protocol.

16. The identity server of claim 11, wherein the programming instructions instruct the at least one hardware processor to:
receive the on-premises verification response message;
determine that the on-premises verification response message comprises a valid on-premises verification reply; and
in response to determining that the on-premises verification response message comprises the valid on-premises verification reply, construct the authentication response to indicate that the authentication succeeds.

17. The identity server of claim 16, wherein determining that the on-premises verification response message comprises the valid on-premises verification reply comprises verifying that the on-premises verification response message includes a signature signed by the on-premises agent.

18. The identity server of claim 11, wherein the programming instructions instruct the at least one hardware processor to:
- determine that the on-premises verification response message has not been received within a configured time period or that the on-premises verification response message does not comprise a valid on-premises verification reply;
- determine, based on a security policy associated with the on-premises agent, that an additional authentication credential is configured to be requested; and
- request the additional authentication credential based upon the determining that the additional authentication credential is configured to be requested.

19. The identity server of claim 11, wherein the programming instructions instruct the at least one hardware processor to:
- determine that the on-premises verification response message has not been received within a configured time period or that the on-premises verification response message does not comprise a valid on-premises verification reply;
- determine, based on a security policy associated with the on-premises agent, that an additional authentication credential is not configured to be requested; and
- construct the authentication response to indicate that the authentication fails based upon the determining that the additional authentication credential is not configured to be requested.

20. A non-transitory computer-readable medium containing instructions which, when executed, cause a computing device to perform operations comprising:
- receiving, at an identity server, from a client device, an authentication request;
- in response to receiving the authentication request, transmitting, from the identity server to the client device over a network, an on-premises verification command, wherein the on-premises verification command indicates an on-premises agent that verifies whether the client device has on-premises network connectivity;
- determining, by the identity server, whether an authentication succeeds or fails based on whether an on-premises verification response message is received from the client device in response to the on-premises verification command, wherein the on-premises verification response message indicates whether the client device has on-premises network connectivity; and
- transmitting, by the identity server, an authentication response, wherein the authentication response indicates whether the authentication succeeds or fails based on whether the on-premises verification response message is received from the client device in response to the on-premises verification command.

* * * * *